US 7,337,171 B2

(12) United States Patent
Gimpl et al.

(10) Patent No.: US 7,337,171 B2
(45) Date of Patent: Feb. 26, 2008

(54) APPARATUS AND METHOD FOR SHARING A VIRTUAL FILE SYSTEM BETWEEN LOGICAL PARTITIONS

(75) Inventors: David Joseph Gimpl, Rochester, MN (US); Thomas Marcus McBride, Mantorville, MN (US); Tammy Lynn Van Hove, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 11/128,050

(22) Filed: May 12, 2005

(65) Prior Publication Data
US 2006/0259710 A1 Nov. 16, 2006

(51) Int. Cl.
*G06F 12/14* (2006.01)
*G06F 12/02* (2006.01)

(52) U.S. Cl. ............... 707/8; 707/9; 711/164; 711/163; 711/153; 711/152; 711/151; 711/173

(58) Field of Classification Search ............... 711/153
See application file for complete search history.

(56) References Cited

U.S. PATENT DOCUMENTS 6,314,501 B1 * 11/2001 Gulick et al. ............... 711/153
6,721,823 B2 * 4/2004 Araki et al. ............... 710/36

OTHER PUBLICATIONS http://support.novell.com/products/tips/10009.html, "Share your config/data files between Windows and Linux for Gaim, Firefox, OpenOffice and GroupWise", pp. 1-2, printed Feb. 3, 2005.
Paul Newton, "Introduction to Disk and File Virtualization", Technical Support/Apr. 2004, pp. 1-2, http://www.naspa.com/PDF/2004/0404/T0404002.pdf.

* cited by examiner

*Primary Examiner*—B. James Peikari
(74) *Attorney, Agent, or Firm*—Martin & Associates, LLC; Derek P. Martin

(57) ABSTRACT

A logically-partitioned computer system provides support for multiple logical partitions to access a single file system, thereby allowing the logical partitions to share a file without the overhead of communicating over a VLAN. An area of shared memory is defined that multiple logical partitions may access. One or more file control blocks that control access to the files in the file system are then created in the shared memory. Existing mechanisms for locking a file system between processes may then be used across logical partitions to serialize access to the file system by all processes in all logical partitions that share the file system. In this manner the sharing of files in a file system is enabled by leveraging existing technology that is used within a single logical partition to extend across multiple logical partitions.

4 Claims, 5 Drawing Sheets

APPARATUS AND METHOD FOR SHARING A VIRTUAL FILE SYSTEM BETWEEN LOGICAL PARTITIONS

BACKGROUND OF THE INVENTION

1. Technical Field

This invention generally relates to data processing, and more specifically relates to file systems on a logically partitioned computer system.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. The IBM eServer iSeries computer system developed by IBM is an example of a computer system that support logical partitioning. If logical partitioning on an eServer iSeries computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Known methods for sharing information between logical partitions typically use a virtual local area network (VLAN). Using VLAN technology, logical partitions may communicate with each other on connections that appear to be physical network connections, when in reality they are virtual network connections between the logical partitions.

At times it may be desirable for logical partitions to share data. A file system is one type of data that may need to be shared, thereby allowing two different logical partitions to access the same file. Using a VLAN to share a file system would introduce significant processing overhead in the form of virtual network traffic and a software stack to support the communications protocol. Without a way to share a file system between logical partitions in a convenient and efficient manner, the computer industry will continue to suffer from inefficient manual methods for sharing data between logical partitions.

DISCLOSURE OF INVENTION

A logically-partitioned computer system provides support for multiple logical partitions to access a single file system, thereby allowing the logical partitions to share a file without the overhead of communicating over a VLAN. An area of shared memory is defined that multiple logical partitions may access. One or more file control blocks that control access to the files in the file system are then created in the shared memory. Existing mechanisms for locking a file system between processes may then be used across logical partitions to serialize access to the file system by all processes in all logical partitions that share the file system. In this manner the sharing of files in a file system is enabled by leveraging existing technology that is used within a single logical partition to extend across multiple logical partitions.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to the sharing of a file system between logical partitions on a logically-partitioned computer system. For those not familiar with the concepts of logical partitions, file systems, and sharing of file systems, this Overview section will provide background information that will help to understand the present invention.

Logical Partitions

Figure 1:
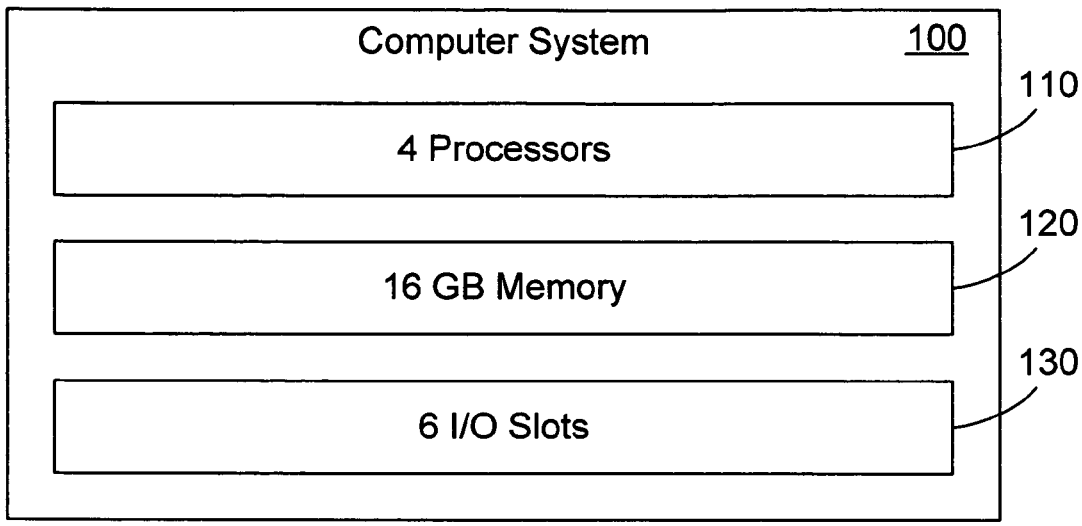
FIG. 1 is a block diagram of a sample prior art computer system.

As stated in the Background Art section above, a computer system may be logically partitioned to create multiple virtual machines on a single computer platform. Referring to FIG. 1, a sample computer system 100 is shown to include four processors 110, 16 GB of main memory 120, and six I/O slots 130. Note that there maybe many other components inside a prior art computer system that are not shown in FIG. 1 for the purpose of simplifying the discussion herein, such as a hard disk drive coupled to one of the I/O slots. We now assume that the computer system 100 is configured with two logical partitions, as shown in computer system 200 in FIG. 2. The first logical partition 210A is defined to have one processor 110A, 6 GB of memory 120A, and three I/O slots 130A. The second logical partition 210B is defined to have three processors 110B, 10 GB of memory 120B, and three I/O slots 130B. Note that the total number of processors 110A+110B equals the four processors 110 in the computer system. Likewise for the memory and I/O slots.

Figure 2:
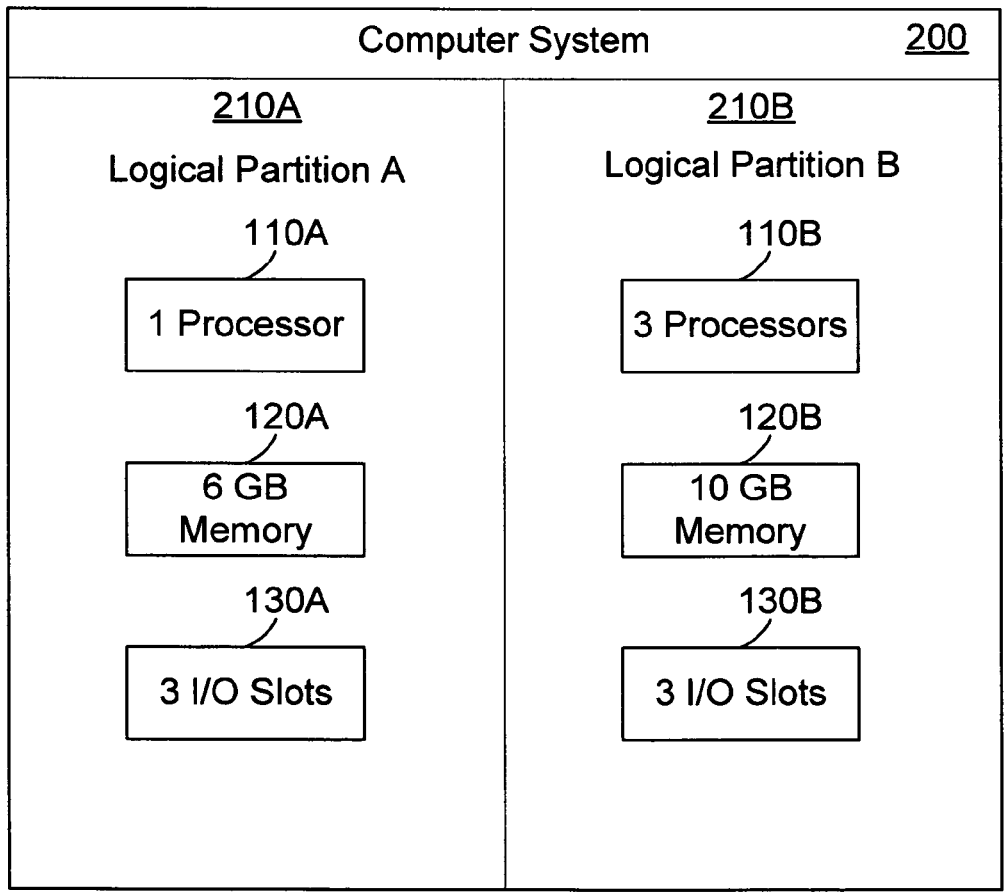
FIG. 2 is a block diagram showing the prior art computer system of FIG. 1 after the hardware resources are assigned to two logical partitions.

The computer system 200 in FIG. 2 shows the allocation of hardware resources to logical partitions. Once the hardware resources are allocated, an operating system may be installed in each logical partition, followed by the installation of utility and/or application software in each logical partition.

Known File System Sharing in Non-Partitioned Systems

Figure 3:
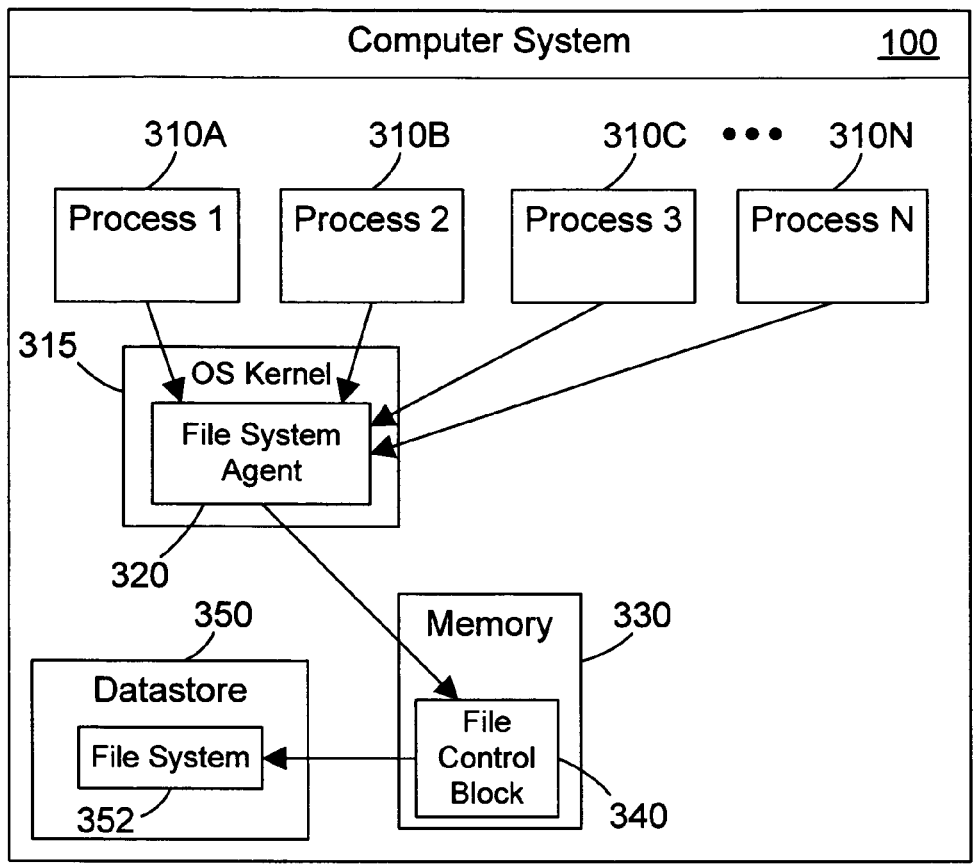
FIG. 3 is a block diagram of the prior art computer system in FIG. 1 showing file sharing between different processes on a computer system that is not logically partitioned.

There are known ways for multiple processes to share a file system in a computer system that is not logically-partitioned. Referring to FIG. 3, a file system 352 in a datastore 350 is accessed using one or more file control blocks 340 residing in memory 330. A plurality of processes, shown in FIG. 3 as processes 310A, 310B, 310C, . . . , 310N each use a file system agent 320 within the operating system kernel 315 to access the files in the file system 352. The file system agent 320 invokes the file control block(s) 340 in memory 330 to gain access to a file in the file system 352. The file control blocks 340 are essentially lock mechanisms that guarantee only one of the processes may access a file stored in the file system 352 at any given time. File control blocks for file systems are well-known in the art, and assure serial access to files when multiple processes try to access a file at the same time.

Figure 4:
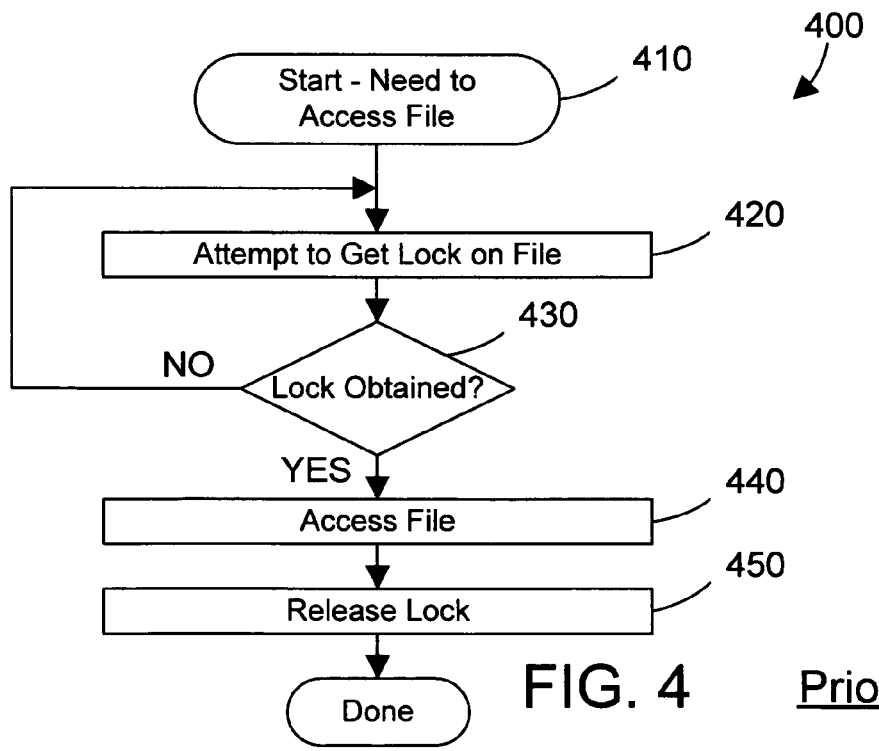
FIG. 4 is a flow diagram of a prior art method for controlling accesses to files in the file system using locks represented in FIG. 3 as file control blocks.

Referring to FIG. 4, a prior art method for using the file control blocks 340 of FIG. 3 to serialize accesses to files by different processes starts when a process needs to access a file (step 410). The process attempts to get a lock on the file (step 420). If the lock is not obtained (step 430=NO), method 400 loops back to step 420 and continues. If the lock is obtained (step 430=YES), the process then accesses the file (step 440), then releases the lock (step 450). Method 400 shows that a process is only allowed to access a file after it has successfully obtained a lock for that file.

File control blocks typically use a construct known as a semaphore or mutex (which stands for mutually exclusive) as the lock mechanism for a file. A semaphore or mutex typically indicate whether the attempt by a process to obtain a lock was successful or not. These concepts of serializing access to files in a file system by multiple processes in a computer system that does not contain logical partitions is well-known in the art. However, these concepts have not been applied to processes that span logical partitions in a logically-partitioned computer system.

2.0 Detailed Description

Figure 5:
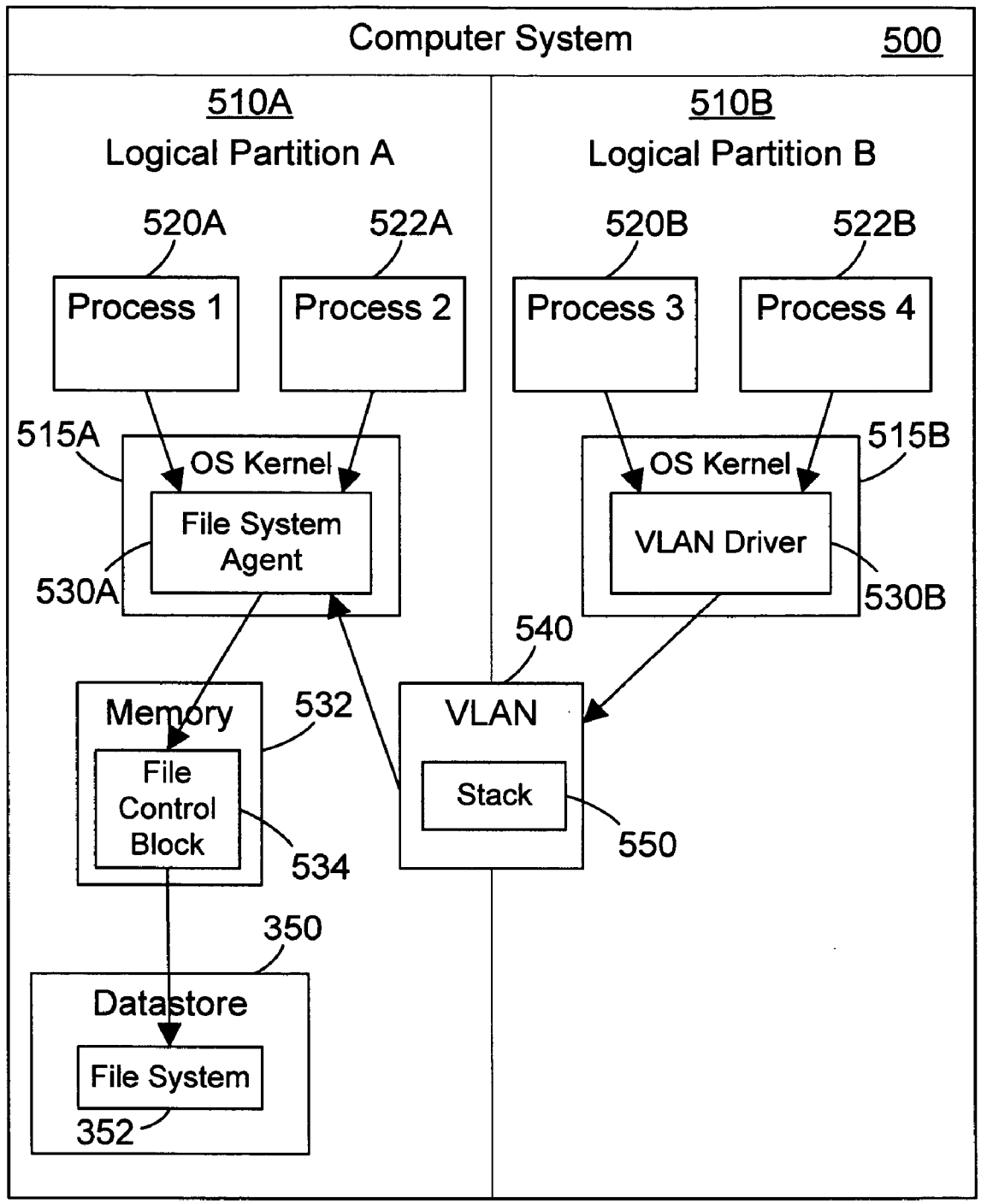
FIG. 5 is a block diagram showing one suitable way that logical partitions could share data via a virtual local area network (VLAN)

One possible way to provide access to a common file system across multiple logical partitions uses a virtual local area network (VLAN). VLANs have been used in logically-partitioned computer systems to provide communication between logical partitions. Referring to FIG. 5, computer system 500 includes two logical partitions 510A and 510B. Two processes 520A and 522A are shown in logical partition 510A, and two processes 520B and 522B are shown in logical partition 510B. The processes 520A and 522A communicate with a file system agent 530A in the operating system kernel 515A in logical partition 510A. File system agent 530A uses one or more file control blocks 534 to access a file system 352 in the datastore 350. The processes 520B and 522B communicate with a VLAN driver 530B in the operating system kernel 515B in logical partition 510B. VLAN driver 530B communicates with the logical partition 510A via VLAN 540.

Once the VLAN is established to enable communication between logical partitions, the VLAN may be used to share the file system 352 in the datastore 350. Note that datastore 350 is shown to reside in logical partition 510A. The processes 520A and 522A in this logical partition 510A may access the file system 352 directly via file system agent 530A without passing through the VLAN 540. However, when the processes 520B and 522B need to access the file system 352, they communicate via the VLAN 540 to gain access to the file system 352. The problem with using the VLAN in this manner is the limited bandwidth that results from the virtual serial connection, and the overhead associated with the software stack 550 within the VLAN 540. The result is a system that succeeds in sharing the file system between logical partitions, but not in an efficient manner. Note that computer system 500 in FIG. 5 represents one possible solution to the problem of sharing a file system across logical partition boundaries, but does not constitute prior art. This example is shown to indicate the drawbacks of such an implementation when compared to the preferred embodiments shown in FIGS. 6 and 7, and described in detail below.

A file system may be shared among logical partitions by defining a shared memory, then defining one or more file control blocks in the shared memory that control access to files in the file system. Once the shared memory with the file control blocks are defined, file system agents in different logical partitions may use the file control blocks to control access to the files in the file system as though the processes running in the different logical partitions were all in the same partition. The preferred embodiments thus leverage the technology of file control blocks which have been used in computer systems that are not logically partitioned to extend beyond the logical partition borders.

Figure 6:
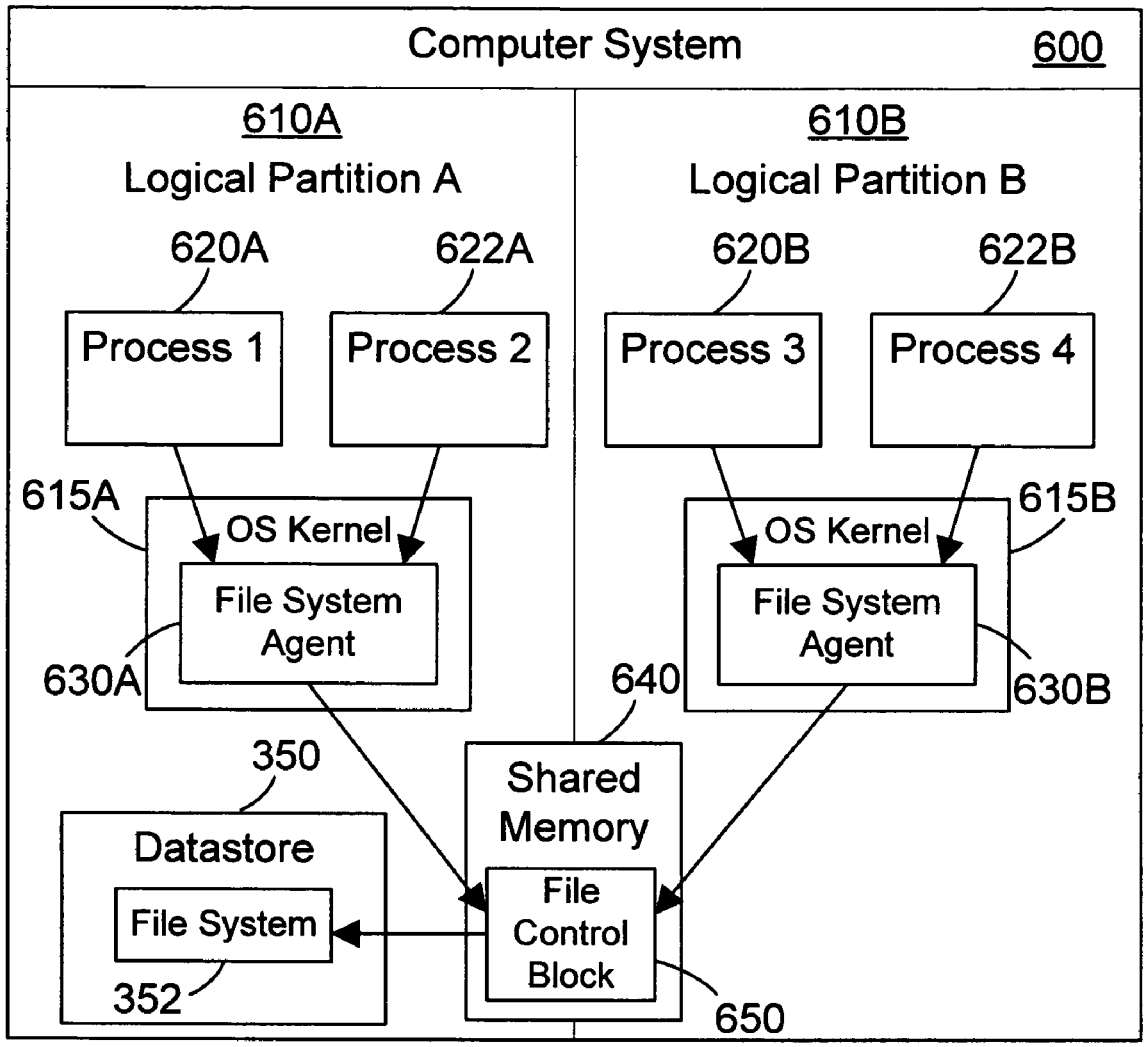
FIG. 6 is a block diagram of a logically-partitioned computer system that shares a file system in accordance with the preferred embodiments.

Referring to FIG. 6, a computer system 600 is one suitable implementation of an apparatus in accordance with the preferred embodiments of the invention. Computer system 600 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. Computer system 100 may include one or more processors, memory, and Input/Output (I/O) devices, similar to the prior art computer system 100 shown in FIG. 1.

The block diagram of FIG. 6 shows interaction between software elements and a physical datastore 350 that contains a file system 352 that is comprised of many files. Computer system 600 includes two logical partitions 610A and 610B. Shared memory 640 is defined that may be accessed by processes in both logical partitions 610A and 610B. The shared memory 640 includes one or more file control blocks 650 that serialize access by different processes to the files in the file system 352 in datastore 350. The first logical partition 610A includes two software processes 620A and 622A that are executed by one or more of the processors in computer system 600. The processes 620A and 622A may access the file system 352 in datastore 350 by making a call to a file system agent 630A in the operating system kernel 615A. The file system agent 630A accesses one or more file control blocks 650 in shared memory 640 to gain exclusive access to a file in the file system 352. The file control blocks 650 are one specific example of a lock mechanism in accordance with the preferred embodiments that allow access to a given file to only one process at a time, in order to assure data integrity.

The second logical partition 610B is shown in FIG. 6 to include two processes 620B and 622B that may call a file system agent 630B in the operating system kernel 615B when access to a file within the file system 352 is desired. The file system agent 630B accesses in shared memory 640 one or more file control blocks 650 associated with the desired file, and if a lock is successfully obtained, the process accesses the file in the file system 352. The preferred embodiments are enabled by defining the shared memory 640, and defining the required file control blocks 650 in the shared memory that control access to the files in the file system 352. At this point, existing methods for serializing access to files using file control blocks may be used for processes in different logical partitions. The preferred embodiments thus leverage technology that has only been used in computer systems that do not contain logical partitions to a system configuration that includes multiple logical partitions.

Figure 7:
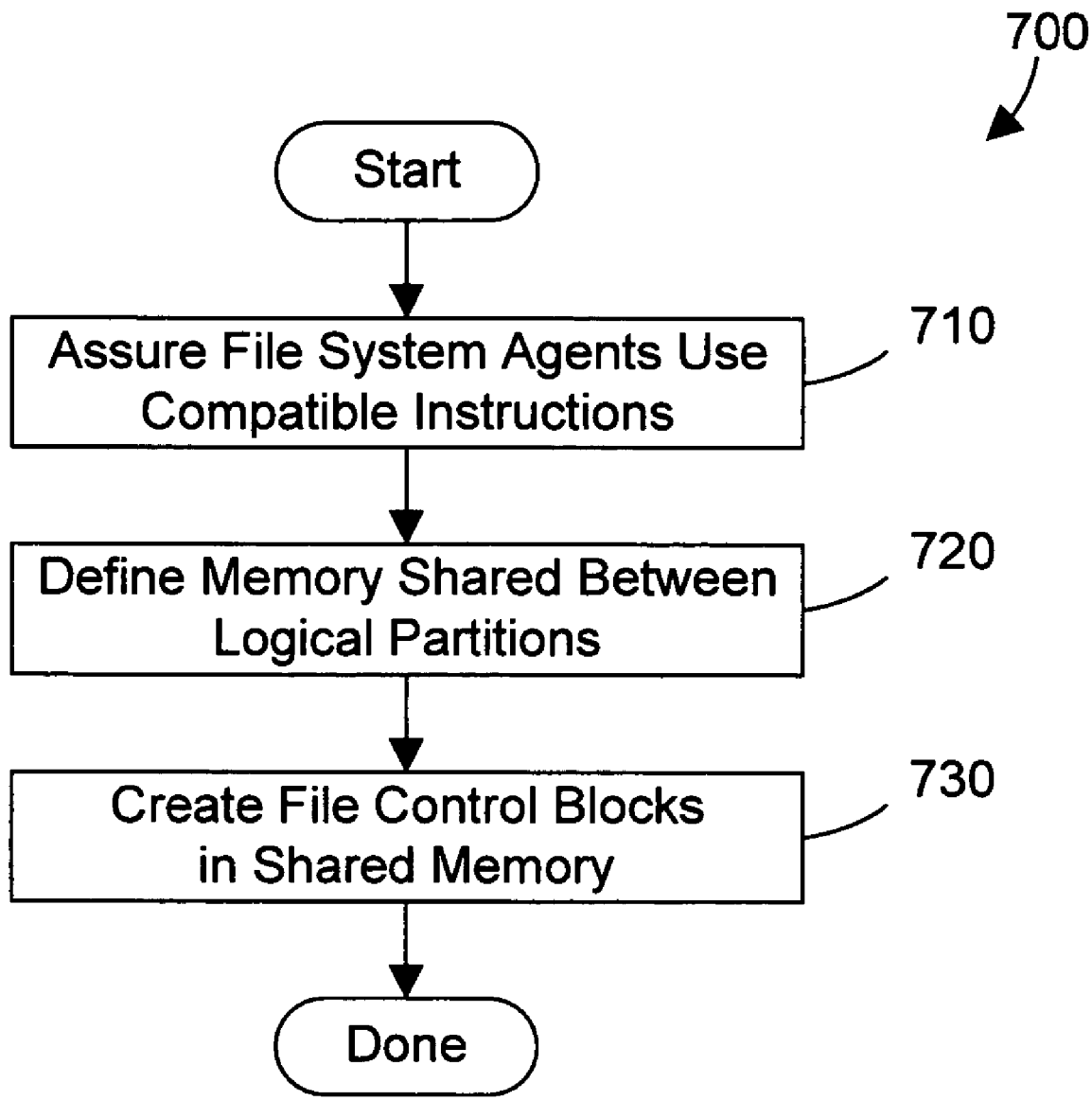
FIG. 7 is a flow diagram of a method for sharing a file system between logical partitions in accordance with the preferred embodiments.

Referring to FIG. 7, a method 700 in accordance with the preferred embodiments is shown. The file system agents in the operating systems of the different logical partitions must use compatible instructions (step 710). If any of the file system agents use instructions that are not compatible with the file system agents in other partitions, an error will indicate that sharing the file system across the logical partitions is not possible. In the example given above, the IBM eServer iSeries computer system is capable of running the i5/OS operating system, the AIX operating system, or a Linux operating system. Because the file system agents in each of these operating systems are based on the PowerPC architecture, we know the instructions used in the file system agents for these three operating systems will be compatible, even though the operating systems themselves are different. A very simple way to determine whether the file system agents use compatible instructions is to determine whether the file system agents use identical code. If the file system agents use the exact same code to access the file control blocks 650 in the shared memory 640, we know for a certainty that the file system agents are compatible in step 710. Thus, by providing compatible file system agents in different operating systems, processes in different logical partitions may share a common file system notwithstanding the different operating systems running in the different logical partitions.

Assuming the file system agents use compatible instructions, a shared memory is defined that may be accessed by both logical partitions (step 720). In the current scheme of logical partitioning used at IBM, a shared memory may be defined by specifying a portion of memory in one logical partition as shared memory that may be accessed by other logical partitions. The logical partition that owns the memory to be shared is referred to as a hosting partition, while the other logical partitions that need to access the shared memory are referred to as hosted partitions. For this specific implementation, the shared memory 640 in FIG. 6 could be part of the memory allocated to logical partition 610A, with permissions set so that processes in logical partition 610B may access the shared memory 640.

Once the shared memory is defined in step 720 of FIG. 7, file control blocks are then created in the shared memory (step 730). The file control blocks (650 in FIG. 6) are similar to known file control blocks in the art that serialize access to files within the file system 352. Once method 700 is complete, the actual serialization of accesses to the file system 352 is performed by the file control blocks 650 using the same techniques known in the art. The primary difference is the file control blocks 650 may be accessed by processes in different logical partitions, thereby leveraging known methods for controlling access to files in a file system across logical partitions. In this manner, the processes in the logical partition 610B may access files in the file system 352 in the different logical partition 610A without even knowing that these files reside in a datastore 350 that is owned by a different logical partition. The file system 352 is thus virtualized for both logical partitions 610A and 610B, which means that each logical partition sees the file system as its own without any knowledge that one or more logical partitions are sharing the file system.

Because the file control blocks 650 are in shared memory 640, the processes in each logical partition may access the files in the file system 352 without suffering the overhead of communicating over a VLAN. The method of virtualizing the file system 352 to other logical partitions is thus very efficient and provides excellent performance for all logical partitions that access the file system.

By leveraging existing technology for controlling accesses to files in a file system by different processes to address the need to share a file system across logical partitions, the sharing and virtualization of a file system is performed without developing an entirely new way to control accesses to the files in the file system. The preferred embodiments thus provide an easy and efficient way for logical partitions to share a file system.

One skilled in the art will appreciate that many variations are possible within the scope of the present invention. For example, those skilled in the art will appreciate that the present invention is capable of being distributed as a program product in a variety of forms, and applies equally regardless of the particular type of tangible, computer-readable signal bearing medium used to actually carry out the distribution. Examples of suitable tangible, computer-readable signal bearing media include, but are not limited to: (i) non-writable storage media (e.g., read only memory devices ("ROM"), CD-ROM disks readable by a CD drive, and Digital Versitile Disks ("DVDs") readable by a DVD drive); (ii) writable storage media (e.g., floppy disks readable by a diskette drive, CD-R and CD-RW disks readable by a CD drive, random access memory ("RAM"), and hard disk drives); and (iii) communications media (e.g., computer networks, such as those implemented using "Infiniband" or IEEE 802.3x "Ethernet" specifications; telephone networks, including cellular transmission networks; and wireless networks, such as those implemented using the IEEE 802.11x, IEEE 802.16, General Packet Radio Service ("GPRS"), Family Radio Service ("FRS"), and Bluetooth specifications). Those skilled in the art will appreciate that these embodiments specifically include computer software downloaded over the Internet.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for sharing access to files stored in a file system by a plurality of processes in a plurality of logical partitions, the method comprising the steps of:

defining a shared memory that is accessible by the plurality of processes in the plurality of logical partitions;

defining a lock mechanism in the shared memory that guarantees only one of a plurality of processes running in the plurality of logical partitions may access a file stored in the file system at any given time;

defining a file system agent residing in each of the plurality of logical partitions that uses the lock mechanism to gain exclusive access to a file stored in the file system, wherein the file system agent resides in an operating system kernel in each of the plurality of logical partitions; and each of the plurality of processes using a file system agent residing in a same logical partition as the process to gain exclusive access to a file stored in the file system.

2. A tangible, computer-readable medium bearing computer-executable instructions for performing the method of claim 1.

3. A computer-implemented method for sharing access to files stored in a file system by a plurality of processes in a plurality of logical partitions, the method comprising the steps of:

defining a shared memory that is accessible by the plurality of processes in the plurality of logical partitions;

defining at least one file control block that serializes access to the files stored in the file system by the plurality of processes; and each process using a file system agent residing in a same logical partition as the process to access the at least one file control block to gain exclusive access to the files stored in the file system, wherein the file system agent resides in an operating system kernel in each of the plurality of logical partitions.

4. A tangible, computer-readable medium bearing computer-executable instructions for performing the method of claim 3.

* * * * *